United States Patent
Chung et al.

(10) Patent No.: US 10,254,491 B2
(45) Date of Patent: Apr. 9, 2019

(54) OPTICAL TRANSCEIVER

(71) Applicant: Prime World International Holdings Ltd., New Taipei (TW)

(72) Inventors: Ming-Hsing Chung, New Taipei (TW); Huan-Yu Lin, New Taipei (TW); Ting-Jhang Liao, New Taipei (TW)

(73) Assignee: Prime World International Holdings Ltd., New Taipei (TW)

( * ) Notice: Subject to any disclaimer, the term of this patent is extended or adjusted under 35 U.S.C. 154(b) by 0 days.

(21) Appl. No.: 15/836,201

(22) Filed: Dec. 8, 2017

(65) Prior Publication Data
US 2018/0252880 A1    Sep. 6, 2018

(30) Foreign Application Priority Data

Mar. 3, 2017 (TW) .............................. 106107123 A

(51) Int. Cl.
*G02B 6/42* (2006.01)
*H04B 10/40* (2013.01)

(52) U.S. Cl.
CPC ......... *G02B 6/4292* (2013.01); *G02B 6/4284* (2013.01); *H04B 10/40* (2013.01); *G02B 6/4246* (2013.01)

(58) Field of Classification Search
CPC .. G02B 6/4292; G02B 6/4284; G02B 6/4246; H04B 10/40
See application file for complete search history.

(56) References Cited

U.S. PATENT DOCUMENTS

| | | |
|---|---|---|
| 3,944,040 A | 3/1976 | Richard |
| 6,048,001 A | 4/2000 | Miller et al. |
| 6,447,170 B1 | 9/2002 | Takahashi et al. |
| 6,886,222 B2 | 5/2005 | Vitry |
| 6,957,979 B2 | 10/2005 | Welsh et al. |
| 7,032,939 B2 | 4/2006 | Magnusson |
| 7,066,765 B2 | 6/2006 | Togami et al. |

(Continued)

OTHER PUBLICATIONS

U.S. Office Action dated Nov. 29, 2018, received in U.S. Appl. No. 15/850,766, 14 pgs.

(Continued)

*Primary Examiner* — John Bedtelyon
(74) *Attorney, Agent, or Firm* — Grossman Tucker Perreault & Pfleger, PLLC

(57) ABSTRACT

An optical transceiver includes casing, fastening member and driving member. The fastening member is movably disposed in the casing to be either in fastened position or released position. The fastening member has a first inclined surface. The first inclined surface has a start end and a stop end. Distance between the start end and the supporting surface is larger than distance between the stop end and the supporting surface. The driving member is movable in the casing. When the driving member presses the first inclined surface from the start end to the stop end, the driving member facilitates the movement of the fastening member from the fastened position to the released position. When the fastening member is in the fastened position, the fastening member is fastened to the fastening portion. When the fastening member is in the released position, the fastening member is removed from the fastening portion.

11 Claims, 9 Drawing Sheets

(56) References Cited

U.S. PATENT DOCUMENTS

| | | |
|---|---|---|
| 7,185,927 B2 | 3/2007 | Talukdar et al. |
| 7,204,712 B2 | 4/2007 | Schwiebert et al. |
| 7,313,937 B2 | 1/2008 | Straka, Jr. |
| 7,374,347 B1 | 5/2008 | Oki et al. |
| 7,422,457 B1 * | 9/2008 | Wu ................. G02B 6/4201 439/258 |
| 7,537,476 B1 | 5/2009 | McColloch |
| 7,566,245 B1 | 7/2009 | McColloch |
| 7,648,289 B2 | 1/2010 | Miyoshi et al. |
| 7,901,017 B1 | 3/2011 | Kafferlin |
| 8,506,172 B2 | 8/2013 | Meadowcroft et al. |
| 8,790,022 B2 | 7/2014 | Yi |
| 8,986,036 B2 * | 3/2015 | Lindkamp .......... G02B 6/4246 439/160 |
| 9,028,155 B2 * | 5/2015 | Wang ................ G02B 6/4261 385/92 |
| 9,176,289 B2 | 11/2015 | Yi |
| 9,348,101 B2 * | 5/2016 | Wang ................ H01R 13/6335 |
| 9,470,859 B2 | 10/2016 | Arekar et al. |
| 9,523,826 B2 * | 12/2016 | Tsai ..................... G02B 6/423 |
| 9,798,099 B2 * | 10/2017 | Nguyen .............. G02B 6/4284 |
| 9,841,568 B2 | 12/2017 | Wang et al. |
| 2003/0198025 A1 | 10/2003 | Cao |
| 2005/0226587 A1 | 10/2005 | Minota et al. |
| 2009/0321301 A1 | 12/2009 | Song et al. |
| 2012/0106903 A1 | 5/2012 | Thirugnanam et al. |
| 2014/0038447 A1 | 2/2014 | Brown et al. |
| 2014/0126957 A1 | 5/2014 | Shi et al. |
| 2014/0168905 A1 | 6/2014 | Yi |
| 2014/0169749 A1 | 6/2014 | Yi |
| 2015/0263453 A1 | 9/2015 | Wang et al. |
| 2015/0331210 A1 | 11/2015 | Lee |
| 2016/0130840 A1 | 5/2016 | Garneau |
| 2016/0174394 A1 | 6/2016 | Lee |
| 2016/0178856 A1 * | 6/2016 | Chang ................. G02B 6/4246 385/92 |
| 2016/0216460 A1 | 7/2016 | Yang et al. |
| 2016/0252691 A1 | 9/2016 | Arekar et al. |
| 2016/0341913 A1 | 11/2016 | Wang |

OTHER PUBLICATIONS

U.S. Office Action dated Sep. 26, 2018, received in U.S. Appl. No. 15/722,317, 14 pgs.

\* cited by examiner

OPTICAL TRANSCEIVER

CROSS-REFERENCE TO RELATED APPLICATIONS

This non-provisional application claims priority under 35 U.S.C. § 119(a) to Patent Application No. 106107123 filed in Taiwan on Mar. 3, 2017, the entire contents of which are hereby incorporated by reference.

TECHNICAL FIELD

The disclosure relates to an optical transceiver, more particularly to a pluggable optical transceiver.

BACKGROUND

Optical transceivers are commonly used in modern high-speed communication networks. Generally, the optical transceivers are pluggable into a receptacle of a communication device, which is beneficial to improve the design flexibility and to perform maintenance. The receptacle is disposed on a circuit board. The XFP (10 Gigabit Small Form Factor Pluggable) and the QSFP (Quad Small Form-factor Pluggable) are standards for the optical transceivers in order to define the electrical and the mechanical interfaces between the optical transceiver and the corresponding receptacle.

SUMMARY

The present disclosure provides an optical transceiver.

One embodiment of the disclosure provides an optical transceiver is adaptive to be plugged into a receptacle having a fastening portion. The optical transceiver includes a casing, a fastening member and a driving member. The casing has a supporting surface. The fastening member is movably disposed in the supporting surface of the casing to be either in a fastened position or a released position. The fastening member corresponds to the fastening portion, and the fastening member has a first inclined surface. The first inclined surface has a start end and a stop end opposite to each other. A distance between the start end and the supporting surface is larger than a distance between the stop end and the supporting surface. The driving member is movably disposed in the casing. When the driving member is moved from the start end to the stop end to press the first inclined surface of the fastening member, the fastening member is moved from the fastened position to the released position. When the fastening member is in the fastened position, the fastening member is fastened to the fastening portion. When the fastening member is in the released position, the fastening member is removed from the fastening portion.

BRIEF DESCRIPTION OF THE DRAWINGS

The present disclosure will become more fully understood from the detailed description given here in below and the accompanying drawings which are given by way of illustration only and thus are not intending to limit the present disclosure and wherein.

DETAILED DESCRIPTION

Figure 1:
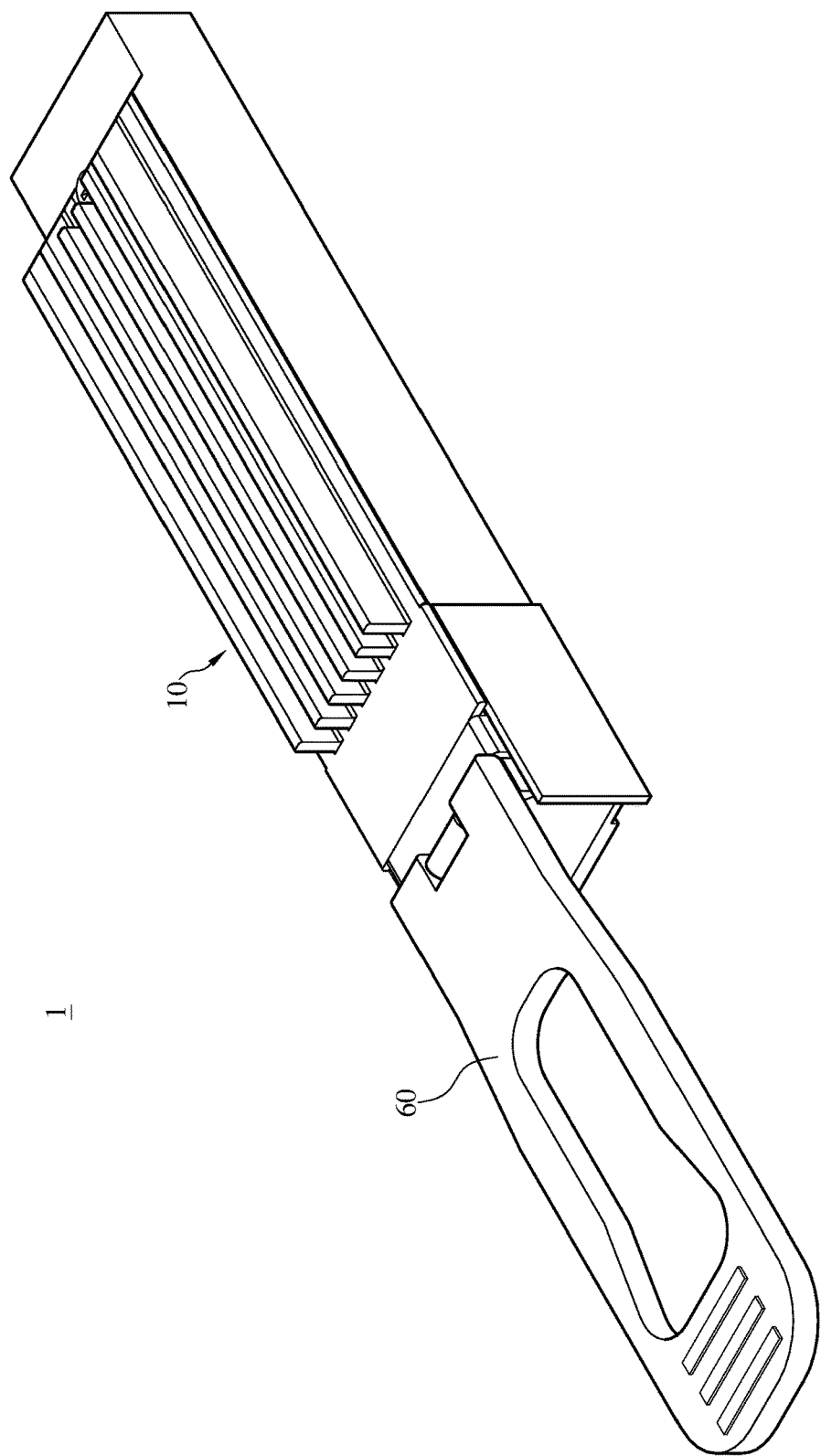
FIG. 1 is a perspective view of an optical transceiver in accordance with one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
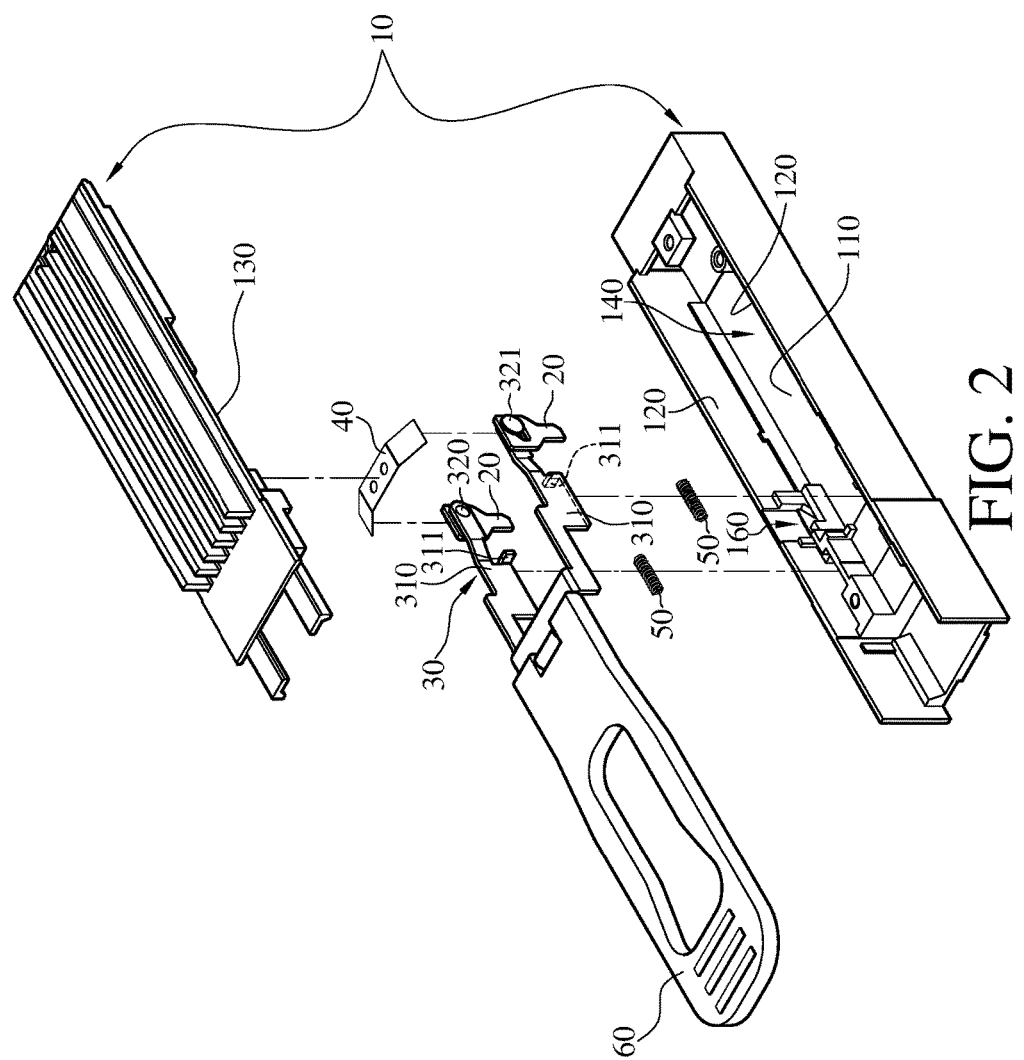
FIG. 2 is an exploded view of the optical transceiver in FIG. 1.
Figure 3:
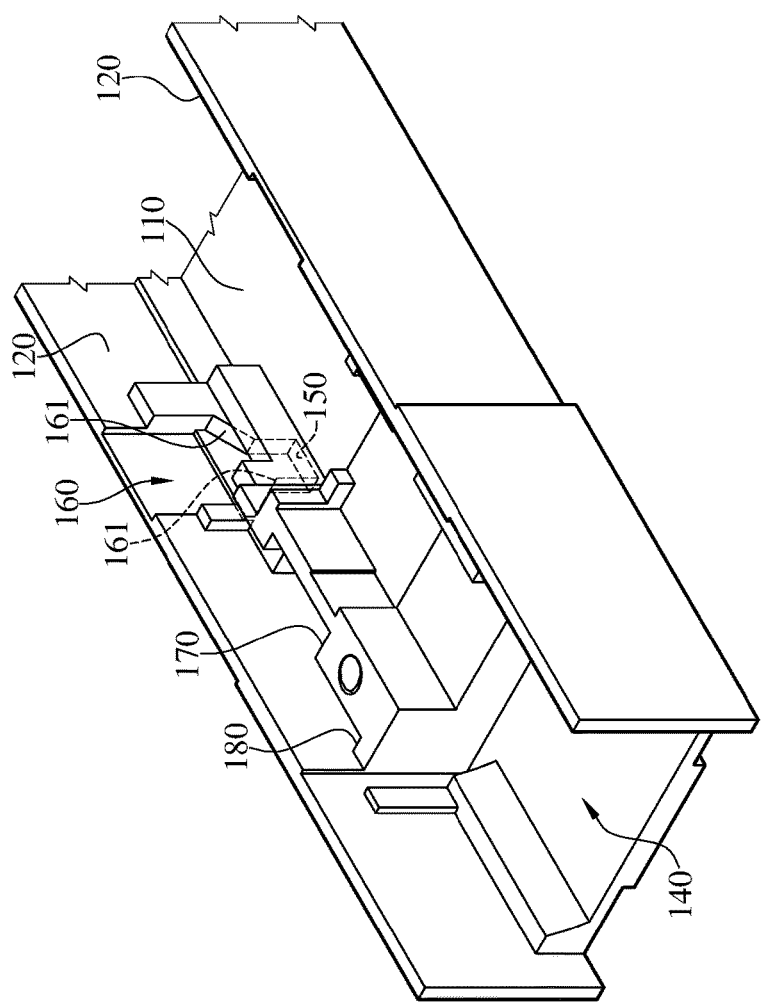
FIG. 3 is a partial enlarged view of a casing of the optical transceiver in FIG. 2.
Figure 4:
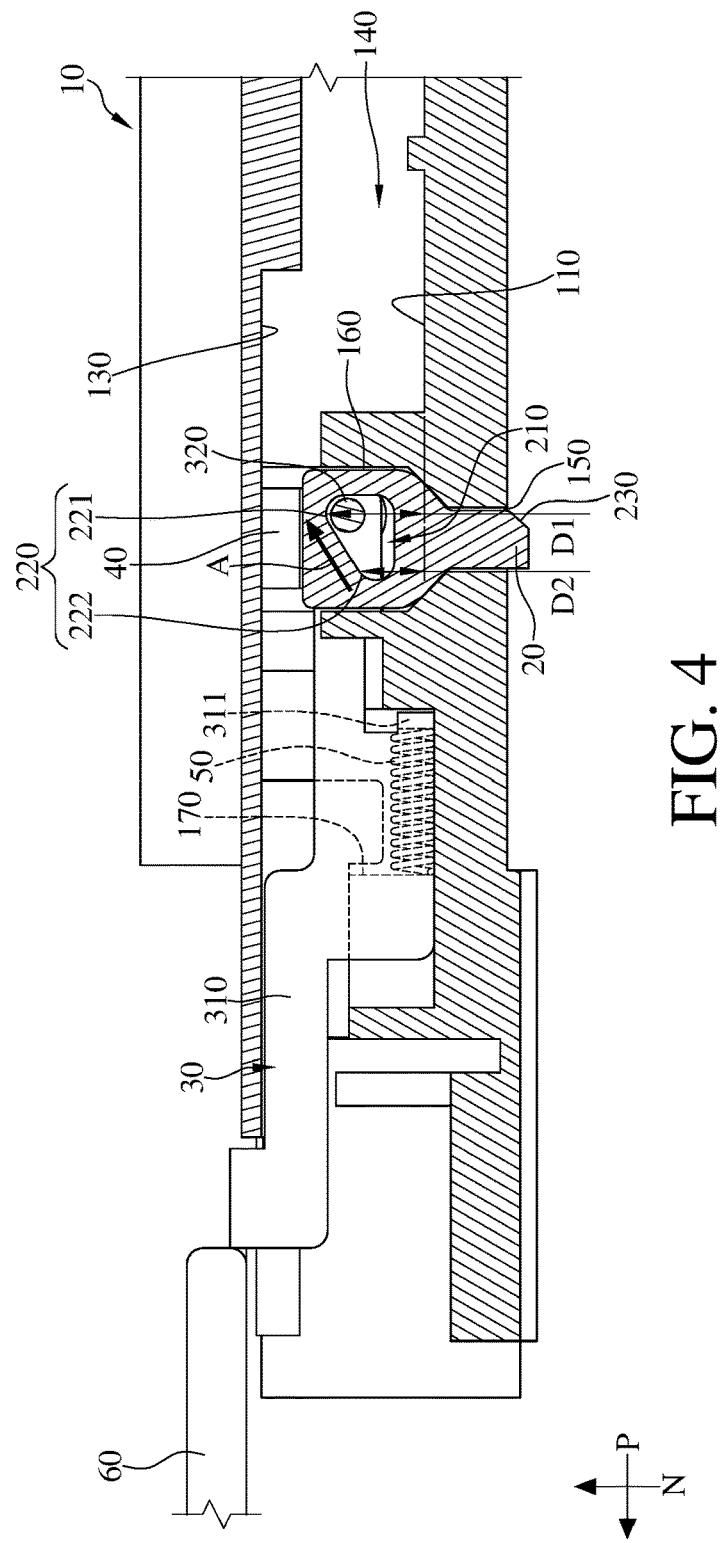
FIG. 4 is a partial enlarged cross-sectional view of the optical transceiver in FIG. 1.
Figure 5A:
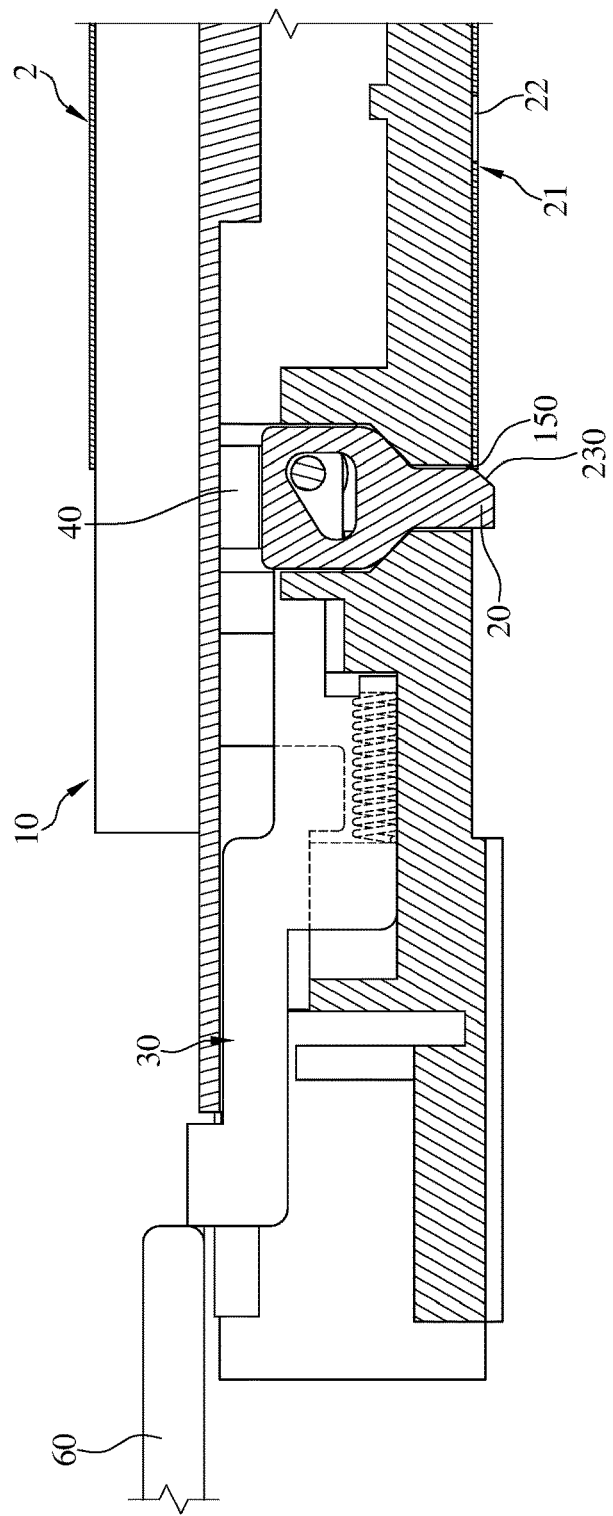
FIGS. 5A-5C are partial enlarged cross-sectional views of the optical transceiver in FIG. 4 plugged into a receptacle.

Please refer to FIG. 1 to FIG. 4. FIG. 1 is a perspective view of an optical transceiver in accordance with one embodiment of the disclosure. FIG. 2 is an exploded view of the optical transceiver in FIG. 1. FIG. 3 is a partial enlarged view of a casing of the optical transceiver in FIG. 2. FIG. 4 is a partial enlarged cross-sectional view of the optical transceiver in FIG. 1. In this embodiment, an optical transceiver 1 is provided. The optical transceiver 1 includes a casing 10, two fastening members 20, a driving member 30, a restoring member 40 and two elastic members 50. The optical transceiver 1 is pluggable into a receptacle (e.g., a receptacle 2 as shown in FIG. 5A). The receptacle 2 has a fastening portion 21, and the fastening portion 21 has two fastening holes 22. It is worth noting that the numbers of the fastening members 20 and the fastening holes 22 are not limited as the result. In other embodiments, the optical transceiver may have only one fastening member, and the receptacle may have only one fastening hole.

The casing 10 has a supporting surface 110, two side surfaces 120 and a top surface 130. The two side surfaces 120 are respectively connected to two opposite sides of the supporting surface 110, and the two side surfaces 120 are located between the supporting surface 110 and the top surface 130. There is an accommodating space 140, which is defined between the supporting surface 110, the side surfaces 120 and the top surface 130. The casing 10 has two through holes 150 on the supporting surface 110, and the casing 10 further has two guiding slots 160 respectively located on the two side surfaces 120. The two guiding slots 160 respectively correspond to the through holes 150. In this embodiment, an end of the guiding slot 160 is connected to the through hole 150. The two through holes 150 respectively correspond to the two fastening holes 22 of the fastening portion 21 when the optical transceiver 1 is plugged into the receptacle 2 (as shown in FIG. 5C). In this embodiment, the casing 10 includes a top casing (not labeled) and a bottom casing (not labeled), and the bottom casing has the supporting surface 110 and the side surfaces 120. However, the protective scope of the present disclosure is not limited to the configuration of the casing 10. In other embodiments, for example the top casing and the bottom casing could be integrated into a single unit.

The two fastening members 20 are movably disposed in the accommodating space 140 of the casing 10. In detail, the two fastening members 20 are respectively located in the two guiding slots 160 on the side surfaces 120. The two fastening members 20 respectively correspond to the two through holes 150. Each of the fastening members 20 has an assembling hole 210 and a first inclined surface 220 on an interior surface of the assembling hole 210. The first inclined surface 220 is a part of the interior surface of the assembling hole 210. The first inclined surface 220 has a start end 221 and a stop end 222 opposite to each other, and a distance D1 between the start end 221 and the supporting surface 110 is larger than a distance D2 between the stop end 222 and the supporting surface 110. In other words, an extension direction A of the first inclined surface 220 and the supporting surface 110 form an acute angle. However, the assembling hole is optional. In other embodiments, the fastening member may have no assembling hole, and the first inclined surface may be located on a corner of the fastening member.

In addition, each of the fastening members 20 further has a guiding inclined surface 230. The driving member 30 includes two driving assemblies, and each of the driving assemblies includes an extending arm 310 and a connecting member 320. The extending arm 310 is movably disposed in the accommodating space 140 of the casing 10. The connecting member 320 is disposed on an end of the extending arm 310 and extends toward the side surface 120 of the casing 10. The connecting member 320 is disposed in the assembling hole 210 of the fastening member 20. In this embodiment, the connecting member 320 has an enlarged portion 321 on an end away from the extending arm 310. The fastening member 20 is located between the enlarged portion 321 and the extending arm 310, and the enlarged portion 321 is larger than the assembling hole 210, such that the fastening member 20 is prevented from being separated from the connecting member 320. The driving member 30 is movable with respect to the casing 10 along a press direction P to enable the connecting member 320 to press the first inclined surface 220 of the fastening member 20, and the press direction P is substantially orthogonal to a normal direction N of the supporting surface 110 of the casing 10. While the connecting member 320 presses against the first inclined surface 220, the connecting member 320 causes the fastening member 20 to move from a fastened position (as shown in FIG. 4) to a released position (shown in FIG. 5B) along the guiding slot 160.

The restoring member 40 is, for example, an elastic piece. The restoring member 40 is located in the accommodating space 140 of the casing 10 and disposed on a top surface 130 of the casing 10. When the fastening members 20 are moved toward the top surface 130 of the casing 10, the restoring member 40 is pressed by the fastening members 20 to store the elastic energy. The restoring member 40 could help facilitate the movement of the fastening members 20 away from the top surface 130 while releasing its elastic energy.

The two elastic members 50 are, for example, two compression springs. The elastic members are disposed in the accommodating space 140 of the casing 10. In detail, the casing 10 further has two first restricting surfaces 170, and each of the extending arms 310 of the driving member 30 has a second restricting surface 311. The second restricting surfaces 311 of the two extending arms 310 are respectively face the two first restricting surfaces 170. The two elastic members 50 are respectively disposed in space between the first restricting surfaces 170 and the second restricting surfaces 311.

Figure 5B:
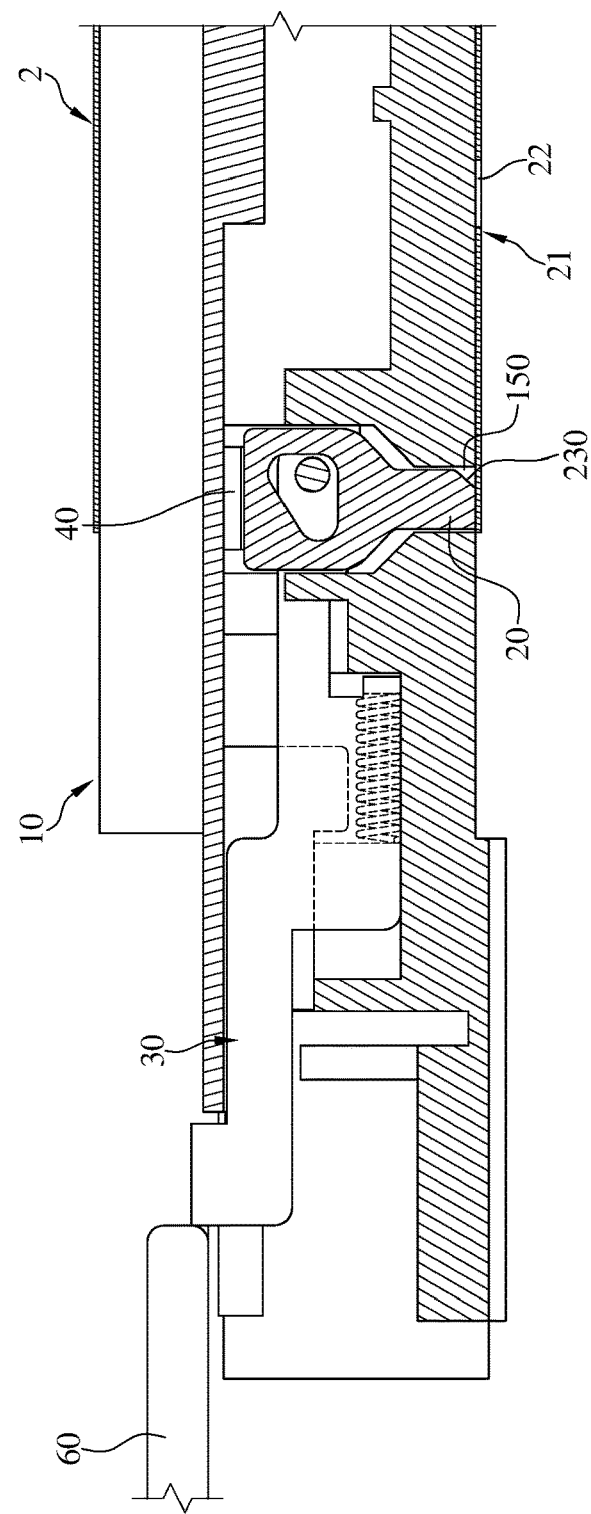
Figure 5C:
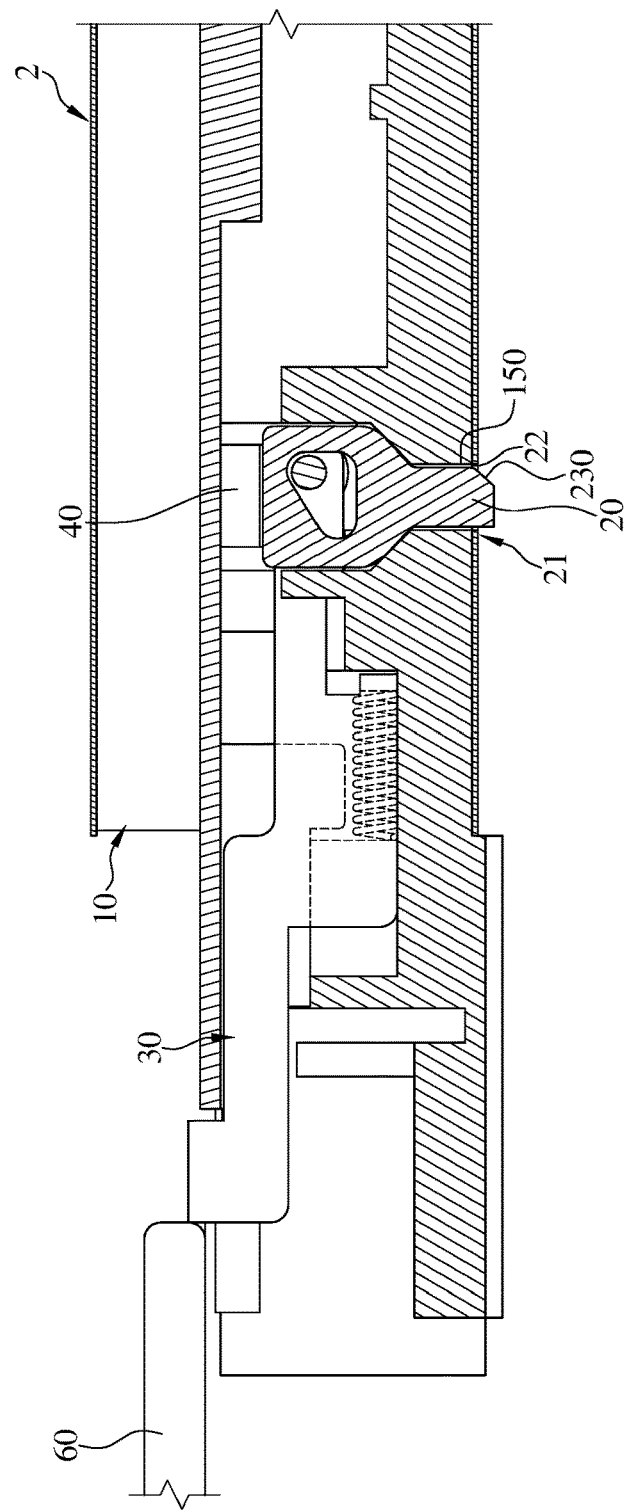

Please refer to FIG. 4 and further refer to FIGS. 5A-5C. FIG. 5A to FIG. 5C are partial enlarged cross-sectional views of the optical transceiver in FIG. 4 plugged into a receptacle. As shown in FIG. 4, the fastening member 20 is in the fastened position. At this moment, the fastening member 20 protrudes through the through hole 150 of the casing 10, and the connecting member 320 of the driving member 30 is located at the start end 221 of the first inclined surface 220. The connecting member 320 could be spaced apart from or in slight contact with the first inclined surface 220, which could result in no pressure on the first inclined surface 220.

Then, as shown in FIG. 5A, the optical transceiver 1 is plugged into the receptacle 2, and the guiding inclined surface 230 of the fastening member 20 is pressed by an edge of the receptacle 2. Due to the guiding inclined surface 230, the fastening members 20 are able to be moved from the fastened position to the released position because of the casing 10. While the fastening members 20 are moved from the fastened position to the released position, the restoring members 40 are pressed by the fastening members 20 to store the elastic energy. When the fastening members 20 are in the released position, the fastening members 20 do not block the receptacle 2, allowing for the casing 10 to be plugged into the receptacle 2 smoothly.

Then, as shown in FIG. 5B and FIG. 5C, the casing 10 moves until the fastening hole 22 of the fastening portion 21 is aligned with the fastening member 20. As this moment, the restoring member 40 releases its elastic energy to move the fastening member 20 to penetrate through the through hole 150 and the fastening hole 22. As a result, the fastening member 20 is moved back to the fastened position to be fastened with the fastening portion 21 of the receptacle 2, completing the insertion of the optical transceiver 1.

It is worth to mention that the guiding slots 160 are beneficial to guide and position the fastening members 20.

Figure 6A:
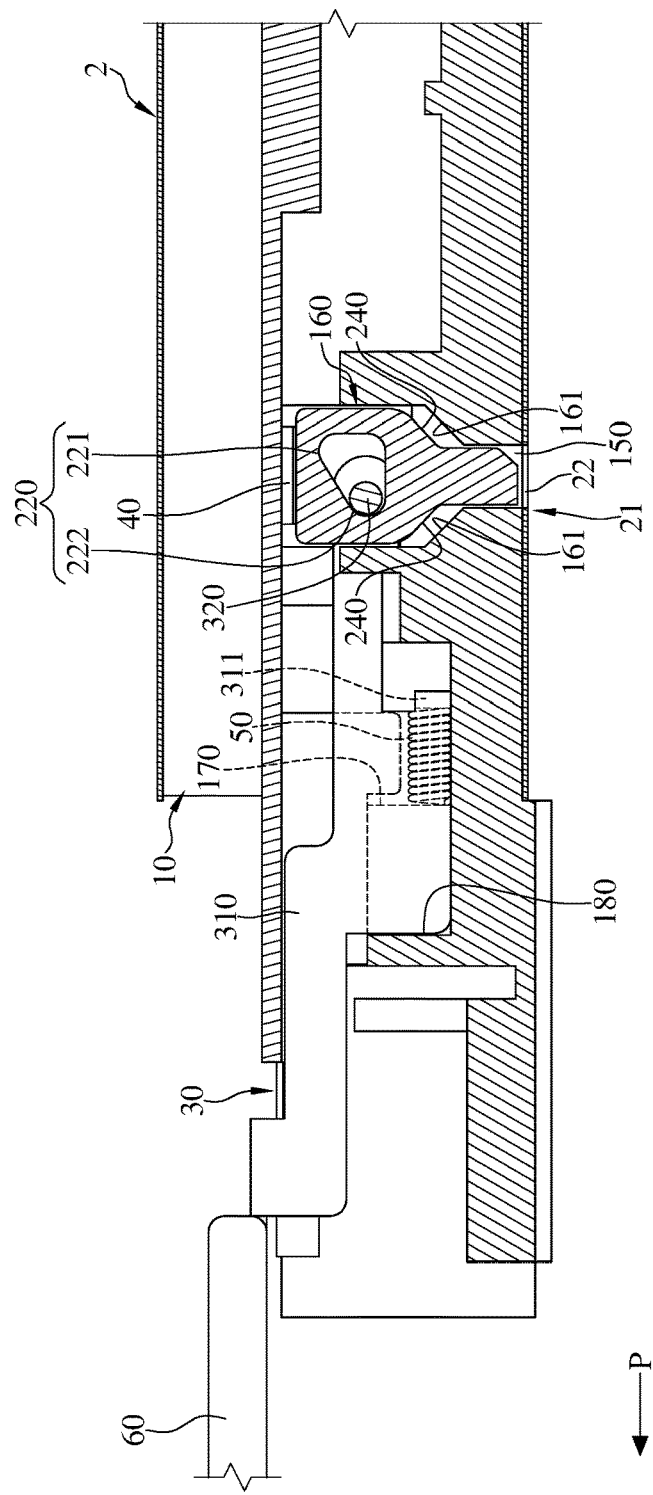
FIGS. 6A-6B are partial enlarged cross-sectional views of the optical transceiver in FIG. 5C pulled out from the receptacle.

In addition, the optical transceiver 1 could be pulled out from the receptacle 2 with the pull of the handle 60. Please refer to FIG. 6A and FIG. 6B, which are partial enlarged cross-sectional views of the optical transceiver in FIG. 5C pulled out from the receptacle. As shown in FIG. 6A, while the extending arm 310 is moved along the press direction P by the pull of the handle 60, the connecting member 320 continuously presses the first inclined surface 220 of the fastening member 20 from the start end 221 to the stop end 222 so as to move the fastening member 20 from the fastened position to the released position. When the fastening member 20 is in the released position, the fastening member 20 is removed from the fastening hole 22 of the fastening portion 21. As this moment, the casing 10 is allowed to be pulled out from the receptacle 2 along the press direction P. In addition, while the fastening member 20 is moved to the released position, the restoring member 40 stores the elastic energy when being pressed by the fastening member 20. When the extending arm 310 is moved along the press direction P, the second restricting surface 311 of the extending arm 310 is moved closer to the first restricting surface 170 of the casing 10 to compress the elastic member 50. The elastic member 50 stores the elastic energy when being compressed.

Figure 6B:
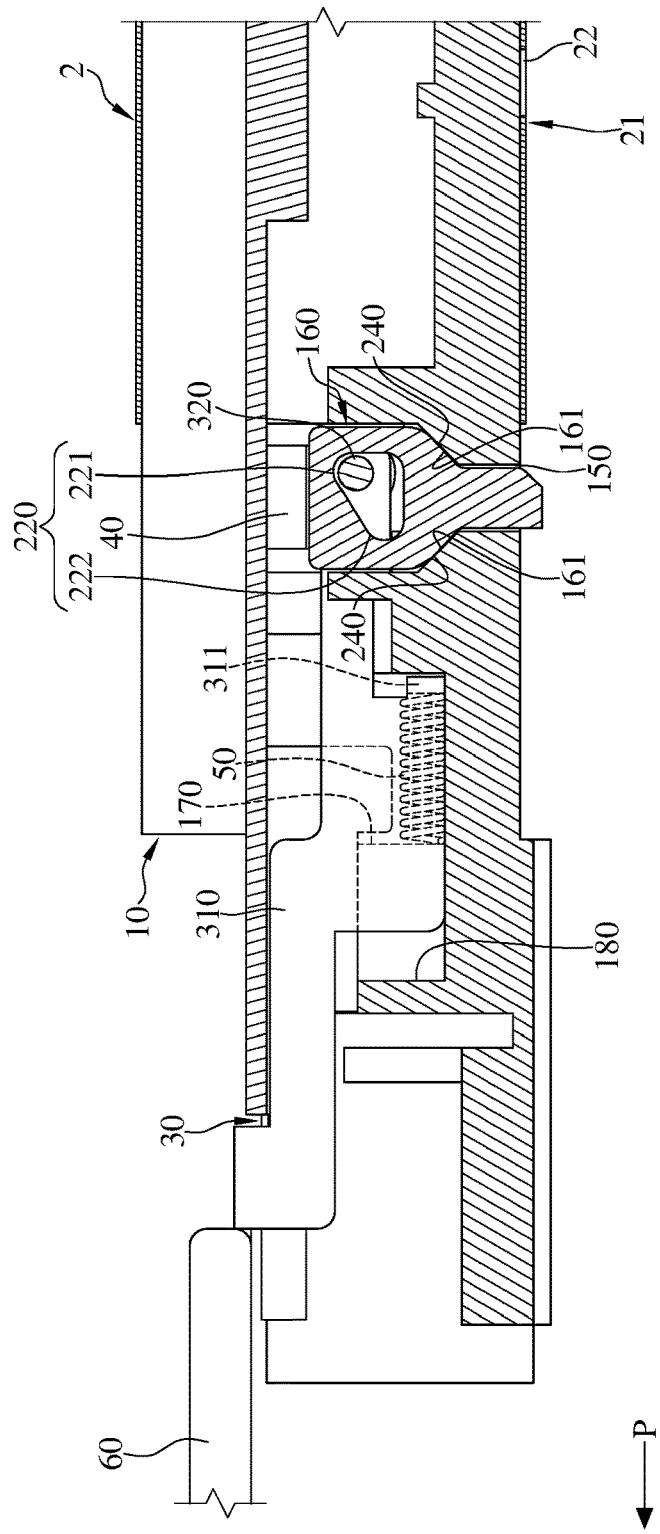

Then, as shown in FIG. 6B, the handle 60 is released, such that the elastic member 50 can release its elastic energy to move the connecting member 320 in a direction opposite to the press direction P. In such a case, the connecting member 320 stops restricting the fastening member 20 so that the fastening member 20 is moved back to the fastened position to penetrate through the through hole 150 by the elastic energy in connection with the restoring member 40.

Further, each guiding slot 160 has two second inclined surfaces 161, and each of the fastening members 20 further has two third inclined surfaces 240. As shown in FIG. 6A, the second inclined surface 161 and the third inclined surface 240 on the right side of the fastening member 20 are parallel to each other, and the second inclined surface 161 and the third inclined surface 240 on the left side of the fastening member 20 are parallel to each other. In other words, these inclined surfaces could render compatible the guiding slot 160 and the fastening member 20. Therefore, when the fastening member 20 is in the fastened position, the two third inclined surfaces 240 of the fastening member 20 are respectively in tight contact with the second inclined surfaces 161, which is beneficial to prevent the electromagnetic interference (EMI). In other embodiments, each of the guiding slots may have only one second inclined surface, and each of the fastening members may have only one third inclined surface.

Moreover, the casing 10 further has two stopping surfaces 180. When the fastening members 20 are in the released position, the stopping surfaces 180 are able to stop the movement of the driving member 30 along the press direction P as the extending arms 310 press against the stopping surfaces 180. Thus, the driving member 30 is prevented from being damaged when being pulled too hard.

According to the optical transceiver as discussed above, because the distance between the start end and the supporting surface is larger than the distance between the stop end and the supporting surface, the driving member is able to move the fastening member from the fastened position to the released position by pressing the first inclined surface of the fastening member. Thus, the fastening member can be engaged with or disengaged from the fastening portion in a fast and efficient manner, rendering more convenient the use of the optical transceiver.

The embodiments were chosen and described in order to best explain the principles of the disclosure and its practical applications, to thereby enable others skilled in the art to best utilize the disclosure and various embodiments with various modifications as are suited to the particular use contemplated. It is intended that the scope of the disclosure be defined by the following claims and their equivalents.

What is claimed is:

1. An optical transceiver, adaptive to be plugged into a receptacle having a fastening portion, comprising:
   a casing, having a supporting surface;
   a fastening member, movably disposed in the casing to be either in a fastened position or a released position, the fastening member having a first inclined surface, the first inclined surface having a start end and a stop end opposite to each other, and a distance between the start end and the supporting surface larger than a distance between the stop end and the supporting surface; and
   a driving member, movably disposed in the casing;
   wherein when the driving member presses the first inclined surface from the start end to the stop end, the driving member causes the fastening member to move from the fastened position to the released position; when the fastening member is in the fastened position, the fastening member is fastened to the fastening portion of the receptacle; when the fastening member is in the released position, the fastening member is removed from the fastening portion.

2. The optical transceiver according to claim 1, wherein the driving member is movable along a press direction to press the first inclined surface, and the press direction is substantially orthogonal to a normal direction of the supporting surface of the casing.

3. The optical transceiver according to claim 2, wherein the driving member comprises an extending arm and a connecting member, the connecting member is disposed on one end of the extending arm and is movable from the start end to the stop end to press against the first inclined surface.

4. The optical transceiver according to claim 3, wherein the fastening member has an assembling hole, the first inclined surface of the fastening member is a part of an interior surface of the assembling hole, and the connecting member is disposed in the assembling hole.

5. The optical transceiver according to claim 1, further comprising a restoring member disposed in the casing; when the fastening member is in the released position, the restoring member is pressed by the fastening member to store elastic energy, and the restoring member facilitates the movement of the fastening member form the released position to the fastened position while releasing its elastic energy.

6. The optical transceiver according to claim 1, wherein the number of the fastening member is two, the casing further has an accommodating space and two side surfaces, the two side surfaces are respectively connected to two opposite sides of the supporting surface, the accommodating space is defined between the supporting surface and the two side surfaces, and the two fastening members are respectively disposed on the two side surfaces.

7. The optical transceiver according to claim 1, wherein the fastening member has a guiding inclined surface, and the guiding inclined surface is adaptive to press against an edge of the receptacle.

8. The optical transceiver according to claim 1, wherein the fastening portion has a fastening hole, the casing has a through hole on the supporting surface and wherein when the fastening member is in the fastened position, the fastening member protrudes through the through hole and is fastened to the fastening hole.

9. The optical transceiver according to claim 8, wherein the casing further has a guiding slot connected to the through hole, the fastening member is movably disposed in the guiding slot, the guiding slot has second inclined surface, the fastening member has a third inclined surface, the third inclined surface is parallel to the second inclined surface and wherein when the fastening member is in the fastened position, the third inclined surface of the fastening member is pressed against the second inclined surface of the guiding slot.

10. The optical transceiver according to claim 1, further comprising an elastic member, wherein the casing further has a first restricting surface, the driving member has a second restricting surface, the first restricting surface faces the second restricting surface, and the elastic member is disposed between the first restricting surface and the second restricting surface.

11. The optical transceiver according to claim 1, wherein the casing further has a stopping surface, and when the fastening member is in the released position, the driving member is pressed against the stopping surface.

* * * * *